(12) United States Patent
Chen

(10) Patent No.: US 6,290,897 B1
(45) Date of Patent: Sep. 18, 2001

(54) PUMPLESS SILVER RECOVERY SYSTEM

(76) Inventor: Eker Y. Chen, 30552 Via Lindosa, Laguna Niguel, CA (US) 92677

( * ) Notice: Subject to any disclaimer, the term of this patent is extended or adjusted under 35 U.S.C. 154(b) by 0 days.

(21) Appl. No.: 09/490,117

(22) Filed: Jan. 24, 2000

(51) Int. Cl.[7] .................................................. C22B 13/08
(52) U.S. Cl. ......................................... 266/101; 266/171
(58) Field of Search ..................................... 266/101, 171

(56) References Cited

U.S. PATENT DOCUMENTS

| | | |
|---|---|---|
| 3,630,505 | 12/1971 | MacKay . |
| 3,655,175 * | 4/1972 | Zeleny et al. ......................... 266/101 |
| 3,692,291 | 9/1972 | MacKay . |
| 3,840,217 | 10/1974 | MacKay . |
| 4,441,697 | 4/1984 | Peterson et al. . |
| 4,457,495 * | 7/1984 | Eder et al. ............................ 266/170 |
| 4,740,244 | 4/1988 | Williams . |
| 4,804,452 | 2/1989 | Rhodes . |
| 5,004,212 | 4/1991 | Gutierrez . |
| 5,472,176 | 12/1995 | Azzara . |
| 5,626,816 * | 5/1997 | Fournier ................................ 266/170 |
| 5,688,401 * | 11/1997 | Bober et al. .......................... 210/199 |
| 5,695,645 * | 12/1997 | Bober et al. .......................... 210/710 |
| 5,873,986 | 2/1999 | Thompson, III et al. . |

OTHER PUBLICATIONS

Product Brochure, METS "An Environmental Treatment System for Reducing Silver Discharge", CPAC, Inc., Leicester, NY (2/94).

* cited by examiner

Primary Examiner—Scott Kastler
(74) Attorney, Agent, or Firm—Guy L. Cumberbatch

(57) ABSTRACT

A simple and reliable silver recovery system including a series of silver recovery processing containers through which solution flows by gravity to a waste container. The reservoir container holding a silver-rich solution is positioned above the processing containers. The outlet of the reservoir container is positioned above the outlet of the first processing container so that when the first processing container is full, fluid flows from the first processing container to a second processing container. The fluid flow is metered by a pinch clamp provided in the conduit between the reservoir container and the first processing container. Steel wool may be used as the silver recovery medium. An inlet manifold insures unobstructed inlet flow and distributes that flow within the processing container. A polymer filter may be positioned above the steel wool to capture large particulate matter and prevent clogging of the system. An outlet pipe leading to the outlet in each processing container is downturned so that the mouth of the pipe is below the fluid surface level to help prevent clogging from floating particulate matter.

18 Claims, 3 Drawing Sheets

PUMPLESS SILVER RECOVERY SYSTEM

FIELD OF THE INVENTION

The present invention relates to a silver recovery system and, more particularly, to a simplified system for recovering silver ions from photographic developing fluids without the use of a pump or other electronic devices.

BACKGROUND OF THE INVENTION

Photographic films including photographic paper typically comprise a base material coated with a light-sensitive emulsion containing various silver salts and silver halides. During the developing process, the films are placed in solutions that chemically react with the emulsion layer in order to develop an image. During this process, some of the silver salts and silver halides dissolve and become suspended within the solutions. For example, one type of film developing solution, called a fixer, is specifically used to dissolve out any silver halides that were not exposed when the picture or image was taken.

Commercial film developing machines process such a large number of batches of photographs each day that recovery of the silver from the used developing fluids becomes cost-effective, even necessary. Of course, silver is a precious metal and is valuable even in fairly small quantities, which presents a financial incentive. Moreover, recovery of silver from commercial film developing operations is regulated by the government as an anti-pollution measure. Certain environmental regulations require that the amount of silver remaining in waste developing fluid be less than or equal to 0.3 parts per million (ppm).

Many commercial film developing machines are single units operated from small retail businesses, such as groceries, drugstores or stationers. Even these single retail units must comply with the relatively stringent environmental regulations and thus must implement a silver recovery process. Unfortunately, the equipment needed for silver recovery is often fairly expensive, and relatively complex to maintain. Understandably, the small business owner is reluctant to make a capital expenditure in such silver recovery equipment, and make the time and effort to learn how to operate it. Therefore, a significant portion of the silver recovery systems are leased and serviced under contract, which can be economically burdensome.

Of course, silver recovery is a relatively mature technology, as exhibited in U.S. Pat. No. 3,840,217 to MacKay, U.S. Pat. No. 4,441,697 to Peterson, et al., U.S. Pat. No. 5,004,212 to Gutierrez, and U.S. Pat. No. 5,472,176 to Azzara. The process typically involves passing the used film developing solution through a container in which is placed a screen, mesh, or porous filler of a metal that is above silver in the electromotive force series. For example, steel wool or woven screen wire may be used for the filler. The resulting galvanic replacement action causes silver to be deposited within the container as the metal is dissolved. After a predetermined time, contents of the container are sent to and further processed at a refinery to recover the silver.

Silver recovery systems available on the market all utilize a variable speed pump to insure an optimum flow rate through a container in which the galvanic reaction occurs. For example, a system denoted the METS model E-100 sold by CPAC equipment division of Leicester, N.Y., includes a variable speed pump that receives fluid directly from the film processing unit, or from an intermediate reservoir. The fluid is pumped to the lower portion of a first silver recovery container where it rises through the silver recovery filler to exit from an upper portion thereof. The precision metering pump is provided so that the fluid passes through the silver recovery container at the proper flow rate for optimum silver recovery.

Despite the availability of commercial silver recovery systems, there is a need for a simpler, more economical system.

SUMMARY OF THE INVENTION

The present invention provides a distinct advantage over prior art silver recovery systems by providing a simple and reliable system that does not include a pump or any other electronic devices. Instead, the present invention relies on a series of containers connected together to define a flow path through which solution flows by gravity. The flow rate of the solution through the containers is regulated by a manual-type valve, preferably a pinch valve.

In accordance with a preferred embodiment of the present invention, a pumpless system for recovering silver ions from a solution comprises a reservoir container for holding a quantity of solution containing silver ions, the reservoir container having an outlet. A first processing container has an interior cavity sized to receive a silver recovery filler material and includes an inlet positioned below the level of the filler material, and an outlet positioned above the level of filler material. A conduit connects the reservoir container outlet to the processing container inlet, the processing container being positioned below the reservoir container to establish gravity flow through the conduit. A manual valve is positioned in the conduit and has variable positions for metering the flow of solution through the conduit. In a preferred embodiment, the conduit is flexible and the manual valve is a pinch clamp. In addition, the reservoir container and first processing container preferably comprise industrial-type buckets. A second processing container similar to the first processing container may be provided in series to receive fluid flow from the first processing container.

In preferred embodiment of the system, a waste container is provided to receive discharge from the last processing container. The silver recovery material may comprise a porous metal above silver in the electromotive force series. Desirably, the filler material is steel wool. An inlet manifold may be positioned to receive fluid flowing through the inlet of the first processing container, the inlet manifold being sized to support the porous metal above the inlet. The inlet manifold is desirably a tubular PVC pipe having a plurality of apertures therein, a clear inlet flow path to the processing container thus being insured. An outlet pipe may be provided in communication with the outlet of the first processing container. The outlet pipe desirably extends generally horizontally into the interior cavity the processing container and terminates in a downturned end to reduce the possibility of particulate matter clogging system.

In a further embodiment of the present invention, a method of recovering silver from a solution is provided. The method includes providing a reservoir container stacked above a processing container, and connecting an outlet of the reservoir container to inlet of the processing container disposed in a lower portion of the processing container. The processing container further includes an outlet disposed in an upper portion thereof, and a mass of porous metal above silver in the electromotive force series positioned therein between the inlet and the outlet. A manual-type valve regulates the flow of solution from the reservoir container to the processing container. The method includes opening the manual-type valve to allow solution to flow from the reservoir container to the processing container until solution flows from the outlet of the processing container, measuring the rate of solution flow from the outlet of the processing container, and adjusting the manual-type valve to vary the flow of solution from the reservoir container to processing container.

A further understanding of the nature and advantages of the invention will become apparent by reference to the remaining portions of the specification and drawings.

DESCRIPTION OF THE PREFERRED EMBODIMENTS

Figure 1:
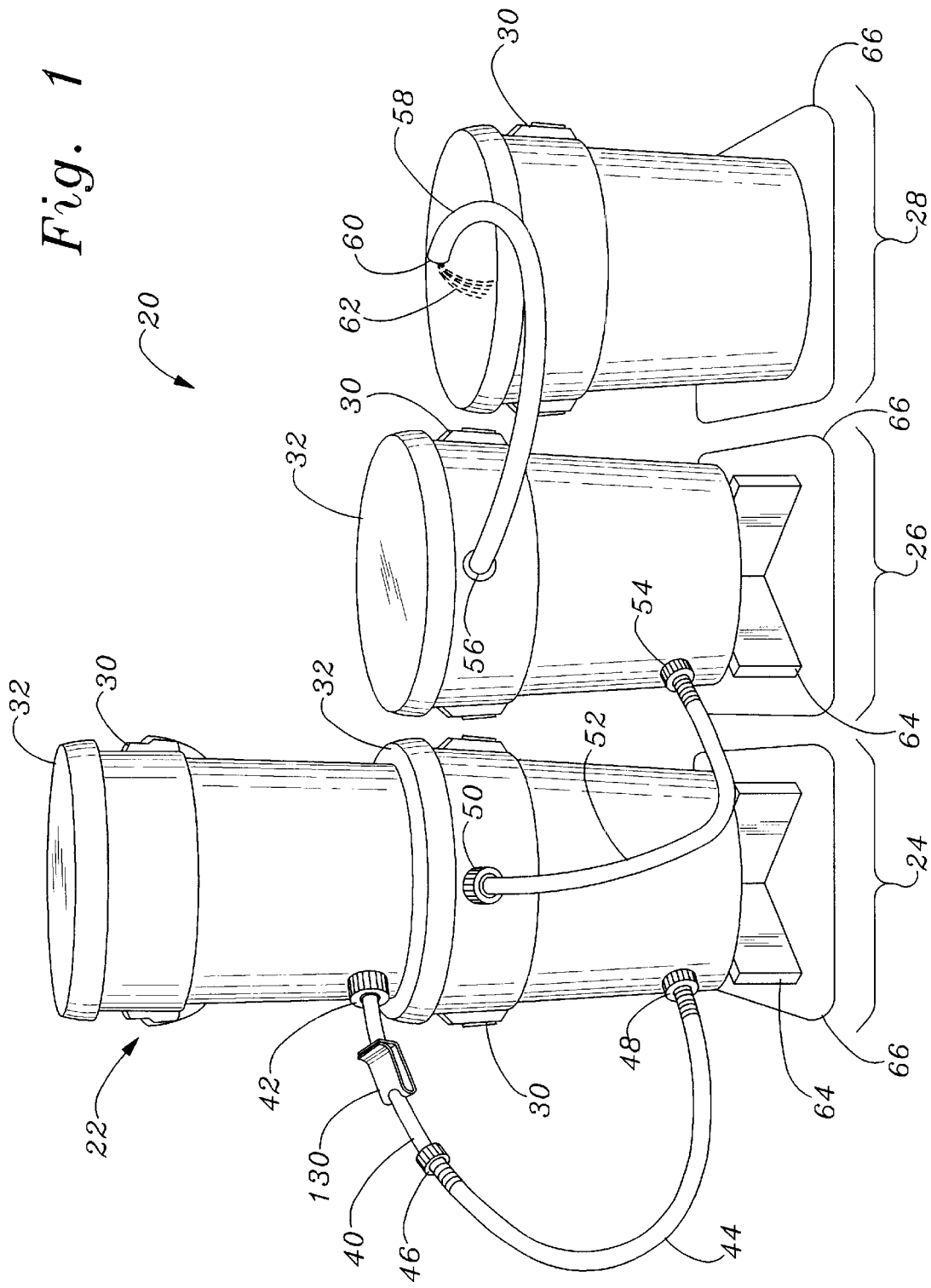
FIG. 1 is a perspective view of an exemplary silver recovery system of the present invention.

FIG. 1 illustrates in perspective a preferred silver recovery system 20 of the present invention comprising a series of containers linked by conduits for flow by gravity of fluid therethrough. In particular, the system includes a reservoir container 22, a first processing container 24, a second processing container 26, and waste container 28. The reservoir container 22 is shown stacked on top of the first processing container 24, but may be elevated in any suitable manner. In a preferred embodiment, each of the containers comprises a 5 gallon industrial bucket 30 having a lid 32, except the lid can be omitted from the waste container 28 as shown.

A flexible tubular conduit 40 is in fluid communication with the interior of the reservoir container via an outlet fitting 42. The outlet fitting 42 is located near the bottom of the reservoir container 22. The conduit 40 is relatively short and is attached in series to a larger main conduit 44 at a disconnect fitting 46. The main conduit 44 is in fluid communication with a lower portion of the first processing container 24 via an inlet fitting 48. The first processing container 24 has an outlet fitting 50 located near an upper end thereof, leading to a transfer conduit 52. The transfer conduit 52, in turn, is in fluid communication with a lower portion of the second processing container 26 via an inlet fitting 54. The second processing container 26 has an outlet fitting 56 located near an upper end thereof leading to a discharge conduit 58. The discharge conduit 58 has a discharge mouth 60 that is positioned over the open waste container 28. A flow of discharge fluid 62 is indicated.

Figure 2:
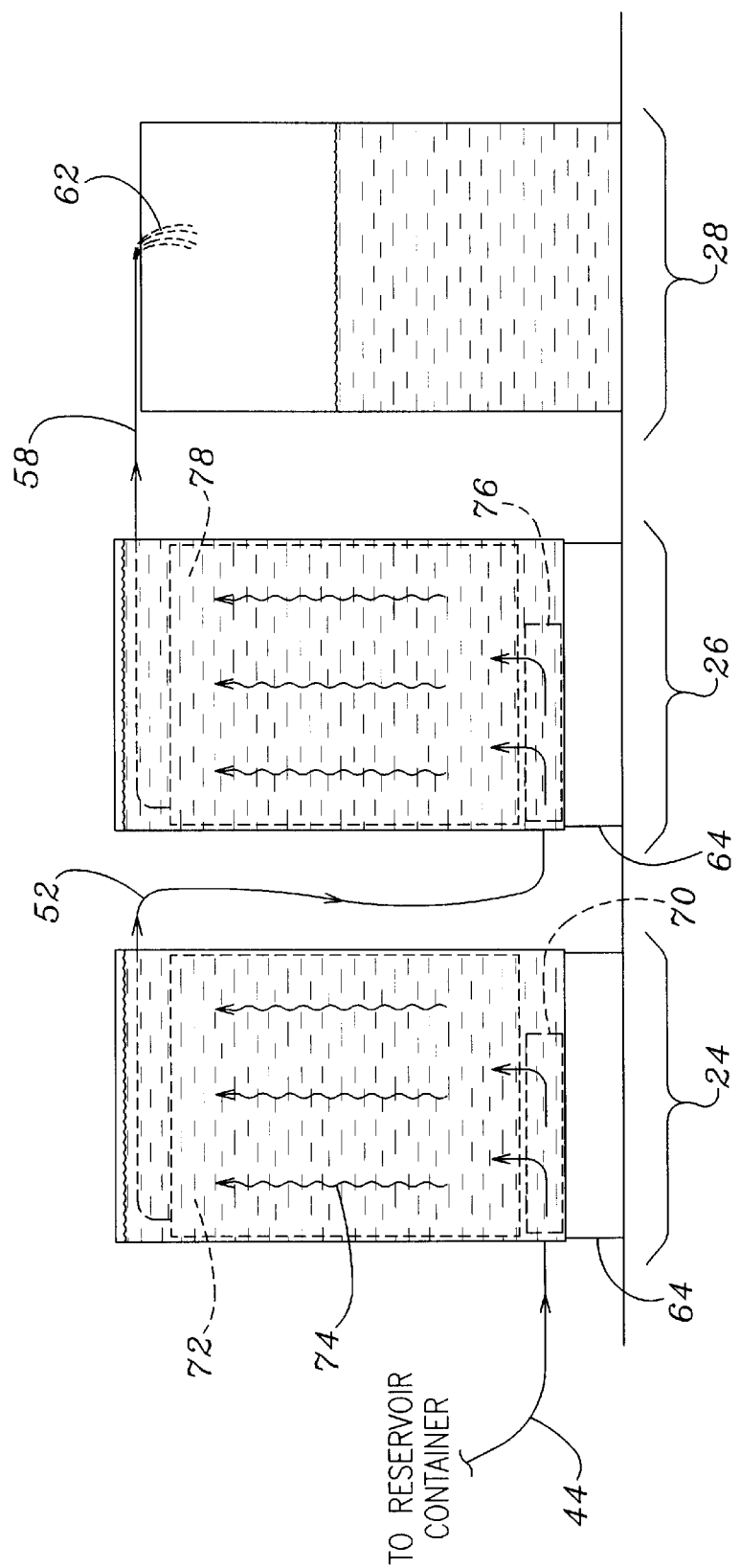
FIG. 2 is a schematic elevational view of the silver recovery system of the present invention.

Because of the relative locations of the various inlet and outlet fittings, silver-rich fluid in the reservoir container 22 drains into the first processing container, from there into the second processing container, and from there into the waste container 28. Specifically, the outlet fitting 42 of the reservoir container 22 is elevated above the outlet fitting 56 of the second processing container 26, which establishes a flow gradient. FIG. 2 schematically illustrates this flow path, with the reservoir container 22 removed. By virtue of a silver recovery mechanism within each of the processing containers 24, 26, the discharge 62 is relatively free of silver ions (e.g., 0.3 ppm), and may be disposed of properly without further special handling. The illustrated embodiment shows two processing containers each of a particular size, but those of skill in the art will understand that only one container may suffice, or a series of more than two containers may be utilized.

With reference again to FIGS. 1 and 2, both the first and second processing containers 24, 26 are elevated on stands 64 so that the outlet fitting 56 for the second processing container is elevated above the open rim of the waste container 28. In this manner, as seen in FIG. 2, fluid that reaches the upper portion of the second processing container 26 will drain through the discharge conduit 58 into the waste container 28. In addition, it is preferable that pads 66 be provided below each of the containers 24, 26, 28 for stability and to catch any fluid leaks.

Figure 3:
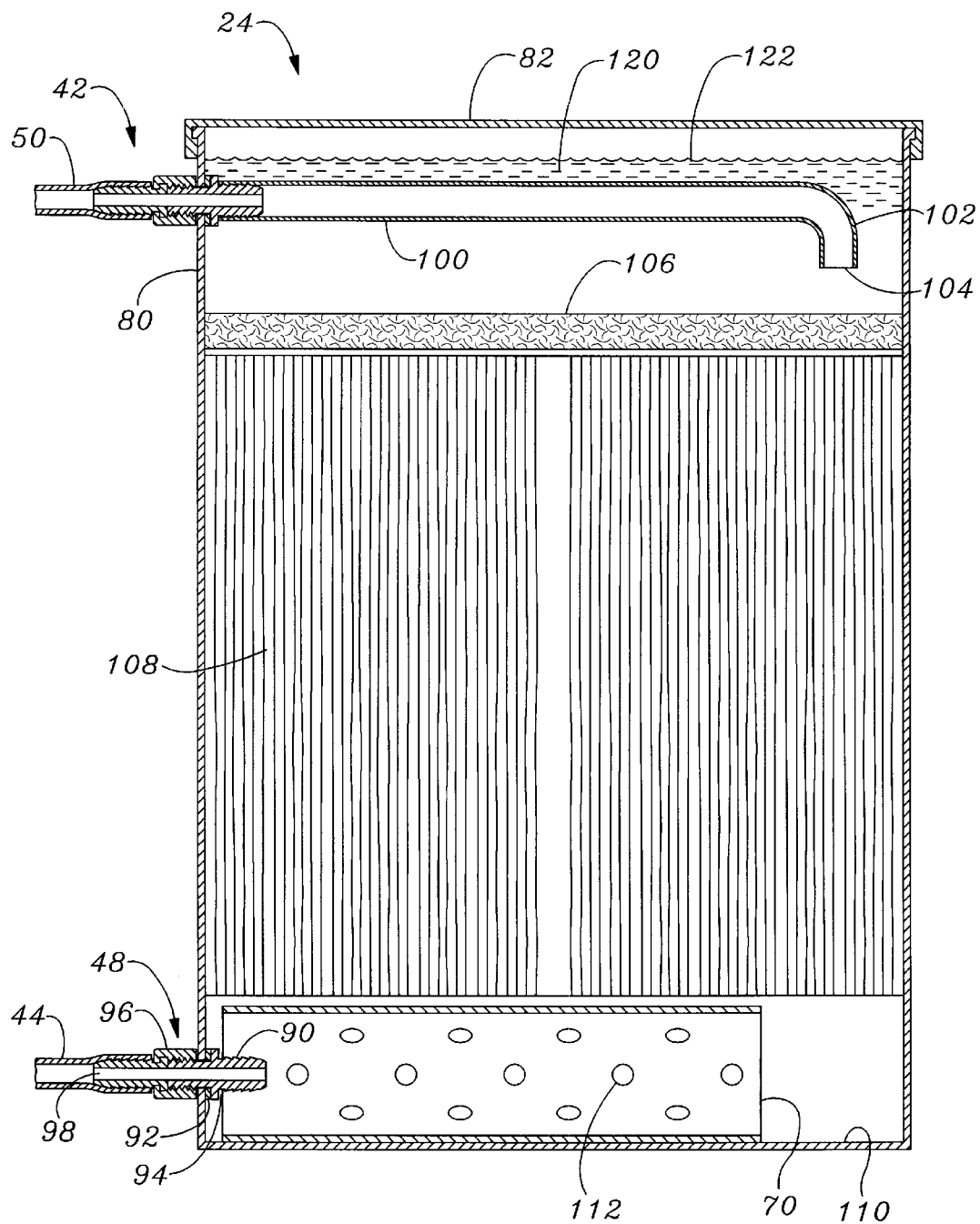
FIG. 3 is a vertical sectional view through a silver recovery container used in the system of the present invention.

With reference to FIG. 2, fluid that enters the first processing container 24 from the main conduit 44 first passes through an inlet manifold 70. The detailed structure of the inlet manifold 70 and an exemplary processing container is seen in FIG. 3. A silver recovery filler material 72 takes up most of the space within the first process container 24 and silver-rich fluid must filter upward through this material, as seen by the flow arrows 74, before reaching the outlet at the upper portion of the container. Likewise, the second processing container 26 has an inlet manifold 76 and a mass of silver recovery filler material 78. Although the two processing containers 24, 26 are shown as identical, they may be constructed differently, or be of different sizes.

Now with reference to the cross-sectional view of FIG. 3, the exemplary processing container 24 comprises a rigid lower housing 80 and a fluid tight lid 82. The outlet fitting 42 and inlet fitting 48 are shown on the same circumferential side of the housing 80, but may be oriented at different locations, such as seen FIG. 1. The outlet and inlet fittings 42, 48 are desirably identical, and comprise a tubular fitting member 90 extending through an aperture in the wall of the housing 80, an elastomeric seal 92 compressed against the inner surface of the housing wall by a flange 94, a clamp nut 96 that threadingly engages an outer portion of the tubular fitting member, and a barbed nipple 98 abutting the outer end of the tubular fitting member and held in place by the clamp nut. Both the inlet conduit 40 and outlet conduit 50 are sized to frictionally engage the respective barbed nipples 98 in a conventional fashion.

The inner end of the tubular fitting member 90 has a barbed exterior to frictionally coupled with an outlet pipe 100 at the upper portion of each processing container. The outlet pipe 100 desirably extends substantially the entire diameter of the housing 80 and terminates in a downturned section 102 and downwardly opening mouth 104. A disk-shaped filter 106 is desirably provided above the silver recovery filler material 108. The filler material 108 is supported above the bottom wall 110 of the housing 80 by the tubular inlet manifold 70. The inlet manifold 70 is desirably a large polymer tube (preferably PVC) having a plurality of flow apertures 112 therein. The inlet fitting 48 is desirably centered about two inches above the bottom wall 110 of the housing 80 and directs incoming fluid through the center of the manifold 70, the fluid flowing out of the manifold through the flow apertures 112 and upward toward the mouth 104 of the outlet pipe 100. In this manner, the inlet flow is unobstructed by the filler material 108 and a relatively uniform distribution of flow through the silver recovery filler material is encouraged.

The inlet manifold 70 is preferably a polymer tube approximately 3 inches in diameter, and 9 inches long. The flow apertures 112 may be a variety of sizes and configurations, but are desirably uniformly distributed around the manifold 70. In a preferred embodiment, the inlet manifold 70 is constructed of PVC tubing having sufficient wall thickness to support a cylindrical steel wool bundle 108 having a diameter of about 9.5 inches and height of about 7 inches.

The silver recovery filler material 108 may be a variety of metals above silver in the electromotive force series, and may take a variety of porous forms, including, but not limited to, twisted wire, screen mesh, or wool. In preferred embodiments, the filler material 108 comprises a cylindrical bundle of steel wool. Such bundles of steel wool can be purchased from a variety of sources, are relatively inexpensive, and have a preferred porosity for the silver recovery process. As fluid travels upward in the processing container 24, silver ions gradually replace the iron ions in the steel wool because of the electromotive potential between the positively charged iron and negatively charged silver. When the discharge fluid 62 has a silver concentration below a predetermined level (e.g., 0.3 ppm), and after all of the solution is processed, flow through the system is stopped and the steel wool removed from the processing containers for transfer to a secondary processing facility which is not a part of the invention. In this manner, relatively the high levels of silver can be efficiently recovered from the steel wool.

The filter 106 rests on top of the filler material 108 and serves to intercept larger particles of waste material produced by the galvanic process. Such particles might travel upward and tend to clog the various fittings and conduits of the system. The filter 106 may be a variety of forms, but is preferably a disk-shaped polymer mesh.

The present invention is further configured to prevent clogging of the various conduits and fittings by virtue of the downturned section 102 of the outlet pipe 100. More specifically, fine particulates 120 in the fluid flow that pass through the filter 106 and that might tend to clog the system, instead float to the top surface 122 of the fluid and form a layer or scum. Because the mouth 104 of the outlet pipe 100 is sufficiently below the top surface 122, relatively little of the fine particulates 120 passes into the outlet pipe. In a preferred embodiment, the mouth 104 is located approximately two inches below the top surface 122 of the fluid in the container 24.

The present invention provides an economical and reliable system for recovering silver from photographic processing waste fluids. Specifically, as mentioned above, each of the components of the system is of conventional construction that can be purchased off-the-shelf for a relatively low cost. Industrial grade buckets, medical grade tubing, standard fittings, and the like all reduce the cost of the system to a fraction of those currently predominating on the market.

Another major difference with currently marketed systems is the mechanism for controlling flow through the system 20. More specifically, as seen in FIG. 1, a pinch clamp 130 is provided in the flexible tubular conduit 40. The pinch clamp 130 is a standard medical grade clamp having a ratcheting closure mechanism for variably compressing the tubular conduit 40. A preferred flow rate of silver-rich fluid can be determined from published data or from empirical testing, and the pinch clamp 130 utilized to regulate the flow rate. Thus, a simple off-the-shelf item costing mere pennies is used in place of a relatively expensive electronic pump and flow gauge. The preferred flow rate through the system 20 can be determined with relatively good accuracy, and monitored by recording the time it takes for the waste container 28 to fill. If the waste container 28 fills too quickly, the operator closes the pinch clamp 130 one notch and re-circulates fluid from the waste container 28, which may contain excessive silver. Conversely, if the waste container 28 fills too slowly, the operator opens the pinch clamp 130 one notch. Ultimately, an optimum flow rate is reached. Because of the disconnect fitting 46, the reservoir container 22, when empty, can be replaced relatively easily by substituting a full reservoir container having the outlet fitting 42, flexible tubular conduit 40, and pinch clamp 130 already attached thereto. Alternatively, fluid may be poured directly into the reservoir container 22.

While the foregoing is a complete description of the preferred embodiments of the invention, various alternatives, modifications, and equivalents may be used. It will be obvious that certain other modifications may be practiced within the scope of the appended claims.

What is claimed is:

1. A pumpless system for recovering silver ions from a solution comprising:

a reservoir container for holding a quantity of solution containing silver ions, the reservoir container having an outlet;

a first processing container having an interior cavity sized to receive a silver recovery filler material, the processing container having an inlet positioned below the level of the filler material and an outlet in a side wall thereof positioned above the level of the filler material;

an outlet pipe positioned within the first processing container and in communication with the outlet thereof, the outlet pipe extending generally horizontally into the interior cavity and terminating in a downturned end having a downwardly opening mouth;

a conduit connected between the reservoir container outlet and processing container inlet, the processing container being positioned below the reservoir container to establish gravity flow through the conduit; and a manual valve positioned in the conduit having variable positions for metering the flow of solution through the conduit.

2. The system of claim 1, wherein the conduit is compressible and the manual valve is a pinch clamp adapted to compress the conduit.

3. The system of claim 1, wherein the reservoir container and first processing container comprise buckets.

4. The system of claim 1, further including:

a second process container having an interior cavity sized to receive a silver recovery material, the second processing container having an inlet positioned below the level of the filler material, and an outlet positioned above the level of the filler material; and a transfer conduit connected between the outlet of the first processing container and the inlet of the second processing container.

5. The system of claim 4, further including a waste container; and a discharge conduit connected to the outlet of the second processing container and positioned to discharge fluid into the waste container from the second processing container.

6. The system of claim 1, wherein the silver recovery filler material comprises a porous metal above silver in the electromotive force series positioned in the first processing container cavity.

7. The system of claim 6, wherein the porous metal comprises steel wool.

8. The system of claim 6, further including an inlet manifold positioned to receive fluid flowing through the inlet into the cavity of the first processing container, the inlet manifold being sized to support the porous metal above the inlet.

9. The system of claim 8, wherein the inlet manifold is a tubular member having a plurality of flow apertures therein.

10. The system of claim 6, further including a filter in the first processing container and on top of the porous metal for intercepting large particulate matter from the silver recovery process.

11. The system of claim 10, wherein the downwardly opening mouth is located above the filter.

12. The system of claim 1, wherein the downwardly opening mouth is located approximately two inches below the outlet.

13. An economical pumpless system for recovering silver ions from a solution, comprising:

a reservoir container for holding a quantity of solution containing silver ions, the reservoir container having an outlet adjacent a lower end;

an outlet fitting attached to the outlet of the reservoir container and a tubular conduit leading from the outlet fitting;

a first processing container having an inlet in a side wall therof and adjacent a lower end, and an outlet adjacent an upper end;

an inlet fitting attached to the inlet of the first processing container, the tubular conduit being attached to the inlet fitting, wherein the reservoir container is elevated such that the outlet of the reservoir container is above the outlet of the first processing container, fluid therefore being caused to flow by gravity from the outlet of the reservoir container through the tubular conduit to the inlet of the first processing container, and thereafter from the outlet of the first processing container;

a mass of porous metal above silver in the electromotive force series positioned in the first processing container to effectuate plating of silver ions from the solution onto the mass of porous metal;

an inlet manifold positioned substantially across the bottom of the first processing container to receive fluid flowing horizontally through the inlet into the cavity of the first processing container, the inlet manifold being sized to support the mass of porous metal above the inlet and including flow apertures therein such that the flow of solution through the inlet is unobstructed by the mass of porous metal; and a pinch clamp positioned in the tubular conduit for regulating the flow of solution from the reservoir container to the first processing container.

14. The system of claim 13, wherein the inlet manifold is a tubular member.

15. The system of claim 14, wherein the mass of porous metal is a cylindrical steel wool bundle having a diameter of 9.5 inches and a height of about 7 inches and the tubular member is a plastic tube having sufficient wall thickness to support the cylindrical steel wool bundle.

16. The system of claim 13, further including a filter in the first processing container and on top of the porous metal for intercepting large particulate matter from the silver recovery process.

17. The system of claim 1, an outlet pipe positioned within the first processing container and in communication with the outlet thereof, the outlet pipe extending generally horizontally into the interior cavity and terminating in a downturned end.

18. The system of claim 17, wherein the downturned end terminates in a downwardly opening mouth positioned below the outlet.

* * * * *